(12) United States Patent
Shinohara et al.

(10) Patent No.: US 6,300,615 B1
(45) Date of Patent: Oct. 9, 2001

(54) PHOTOELECTRIC CONVERSION APPARATUS

(75) Inventors: Mahito Shinohara, Machida; Shin Kikuchi, Isehara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/383,435

(22) Filed: Aug. 27, 1999

(30) Foreign Application Priority Data

Aug. 31, 1998 (JP) .................................................. 10-246209
Aug. 31, 1998 (JP) .................................................. 10-246212

(51) Int. Cl.$^7$ .................................................. H01J 40/14
(52) U.S. Cl. .................................. 250/214 R; 250/208.1
(58) Field of Search ........................ 250/214 R, 214 LA, 250/214 LS, 208.1; 348/308–311, 302; 257/291, 292; 356/218–222

(56) References Cited

U.S. PATENT DOCUMENTS

| | | |
|---|---|---|
| Re. 34,309 | 7/1993 | Tanaka et al. .................. 358/213.31 |
| 5,288,988 | 2/1994 | Hashimoto et al. .............. 250/208.1 |
| 5,424,529 | 6/1995 | Hashimoto et al. .............. 250/208.1 |
| 5,587,738 | 12/1996 | Shinohara ............................ 348/302 |
| 5,698,844 | 12/1997 | Shinohara et al. .............. 250/214 R |
| 5,737,095 | 4/1998 | Kikuchi et al. ...................... 358/475 |
| 5,991,467 | * 11/1999 | Kamiko ................................ 382/312 |

* cited by examiner

*Primary Examiner*—Que T. Le
(74) *Attorney, Agent, or Firm*—Fitzpatrick, Cella, Harper & Scinto (57) ABSTRACT

Provided is a photoelectric conversion apparatus having a pair of transistors respective control electrodes of which are connected to each other, and a capacitor, wherein the pair of transistors are arranged so that a potential of a main electrode of one transistor is fixed to a constant potential and so that a main electrode of the other transistor is connected to the capacitor and wherein a potential or a charge appearing in the capacitor is taken out as a signal.

21 Claims, 7 Drawing Sheets

PHOTOELECTRIC CONVERSION APPARATUS

BACKGROUND OF THE INVENTION

1. Field of the Invention

The present invention relates to a photoelectric conversion apparatus for performing logarithmic compression of light signal quantity into logarithmic output, and a photoelectric conversion apparatus making use of a phototransistor.

2. Related Background Art

There are conventional photoelectric conversion apparatus including those for providing a linear output signal against signal current quantity and those for providing a logarithmically compressed output signal in order to gain a wide dynamic range. A prior art example of such logarithmic compression type photoelectric conversion apparatus is one making use of a so-called logarithmic amplifier.

Figure 1:
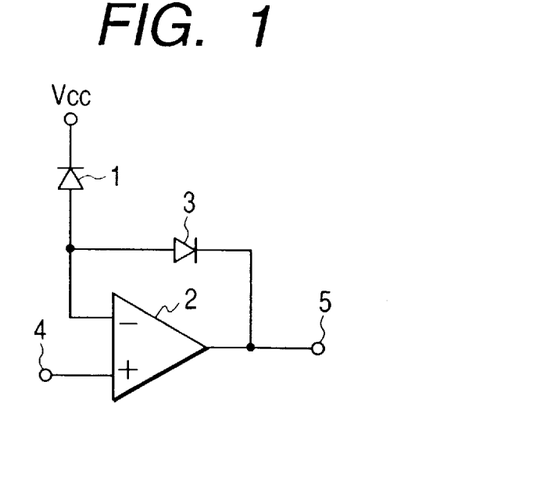
FIG. 1 is a circuit diagram to show a prior art example.

FIG. 1 shows an example of circuitry of the logarithmic amplifier. In FIG. 1, numeral 1 designates a photodiode, 2 an operational amplifier (op amp), 3 a diode, 4 a constant-potential input, and 5 an output terminal. When light is incident to the photodiode 1, a photocurrent according thereto flows into the negative input terminal of op amp 2. In the so-called logarithmic amplifier composed of the operational amplifier (op amp) 2, the diode 3, the constant-potential input 4, and the output terminal 5, the diode 3 is interposed between the output terminal 5 and the negative input side of an inverting input terminal. In such a coordinate system that light quantity/photocurrent is represented on the axis of abscissa while output potential at the output terminal is on the axis of ordinate, a light quantity produces a logarithmically compressed output with flow of a photocurrent to the diode 3. The wide dynamic range property can be achieved in this way.

In the above prior art example, however, one op amp has to be assigned to one light signal current. Therefore, the prior art example had such a drawback that when the prior art example was applied to the photoelectric conversion apparatus composed of an array of many photodiodes, the apparatus needed to have op amps in the same number as the number of pixels and this increased the area and the supply current of the apparatus.

SUMMARY OF THE INVENTION

An object of the present invention is to provide a photoelectric conversion apparatus that permits the logarithmic compression of light signal in a simple circuit configuration.

Another object of the present invention is to provide a photoelectric conversion apparatus using a phototransistor with good optical response.

In order to accomplish the above object, according to one aspect of the present invention, there is provided a photoelectric conversion apparatus comprising a pair of transistors whose respective control electrodes are connected to each other, and a capacitor, wherein said pair of transistors are arranged so that a potential of a main electrode of one transistor is fixed to a constant potential and so that a main electrode of the other transistor is connected to said capacitor, and wherein a voltage or a charge appearing in said capacitor is taken out as a signal.

According to another aspect of the invention, there is provided a photoelectric conversion apparatus comprising a phototransistor having a control electrode portion for receiving light and a main electrode portion for outputting a signal, and potential control means for changing a potential of the main electrode portion without variation of a potential of the control electrode portion.

Other features and objects of the present invention will become more apparent by the description of the specification which follows.

DESCRIPTION OF THE PREFERRED EMBODIMENTS

Figure 2:
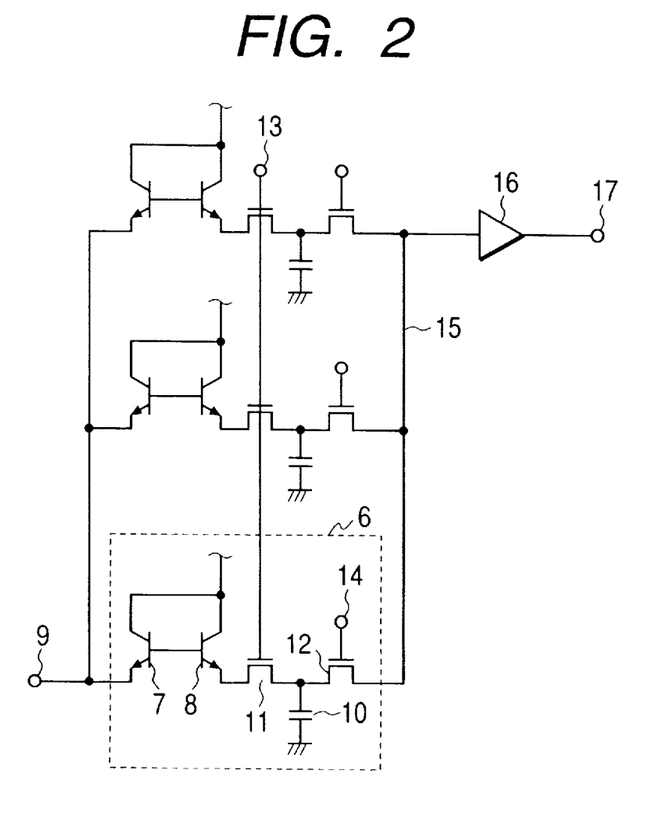
FIG. 2 is a circuit diagram to show the first embodiment.

FIG. 2 is a circuit diagram of the first embodiment which best shows the features of the present invention. In FIG. 2, numeral 6 represents one photoelectric conversion unit and three units are depicted in the same figure.

In FIG. 2, reference numeral 7 denotes a bipolar transistor, 8 does a bipolar transistor, and the bases of the bipolar transistors 7 and 8 are connected or common to each other. Numeral 9 represents a constant-voltage supply terminal which establishes an emitter potential of the bipolar transistor 7, numeral 10 denotes a capacitor, 11 a MOS transistor for switching between the emitter of the bipolar transistor 8 and the capacitor 10, 12 a MOS transistor for reading of a signal appearing in the capacitor 10 by switching, 13 a control terminal common to the units, for switching the gate of each MOS transistor 11 on or off, 14 a control terminal for switching the gate of the MOS transistor 12 on or off, 15 a common output line, 16 an amplifier whose input is output signals through the common output line 15, and 17 an output terminal of the amplifier 16.

Next described is the operation of the photoelectric conversion unit of FIG. 2. The bipolar transistor 7 acts as a phototransistor. When a photocurrent $i_P$ flows in the base, the emitter current $I_{E1}$ of the bipolar transistor 7 becomes a current equal to the photocurrent $i_P$ times a current gain $h_{FE}$. At this time, the base potential $V_B$ of the bipolar transistor 7 with respect to the reference of the potential at the terminal 9, satisfies the following relation, where $I_{S1}$ is a saturation current.

$$I_{E1} = h_{FE} i_P = I_{S1} e^{\frac{qV_B}{kT}} \quad (1)$$

In this equation, q represents the elementary charge, k the Boltzmann constant, and T an absolute temperature.

On the other hand, let $I_{S2}$ be the saturation current of the bipolar transistor 8 and $V_{E2}$ be the emitter potential thereof. When the MOS switch 11 is turned on, the emitter current $I_{E2}$ of the bipolar transistor 8 flows into the capacitor 10 and this satisfies the following relation, where C is the capacitance of the capacitor 10.

$$I_{E2} = I_{S2} e^{\frac{q(V_B - V_{E2})}{kT}} = C \frac{dV_{E2}}{dt} \quad (2)$$

From Eqs. (1) and (2), the following equation holds.

$$\int_0^t i_p dt = \frac{I_{S1}}{h_{FE}} \int_0^t e^{\frac{qV_B}{kT}} dt \quad (3)$$

$$= \frac{I_{S1}}{h_{FE} I_{S2}} \int_0^t I_{E2} e^{\frac{qV_{E2}}{kT}} dt$$

$$= \frac{C I_{S1}}{h_{FE} I_{S2}} \int_0^t \frac{dV_{E2}}{dt} e^{\frac{qV_{E2}}{kT}} dt$$

$$= \frac{C I_{S1}}{h_{FE} I_{S2}} \int_0^t e^{\frac{qV_{E2}}{kT}} dV_{E2}$$

$$= \frac{C I_{S1}}{h_{FE}} \frac{kT}{q} \left( e^{\frac{qV_{E2}}{kT}} - e^{\frac{qV_{E20}}{kT}} \right)$$

In this equation, $VE_{20}$ is an initial value of the emitter potential.

When $VE_{20}$ is selected so as to satisfy the following relation;

$$e^{\frac{qV_{E2}}{kT}} \gg e^{\frac{qV_{E20}}{kT}},$$

the following equation holds.

$$V_{E2} = \frac{kT}{q} \ln \left[ \frac{h_{FE} I_{S2}}{I_{S1}} \frac{q}{kTC} \left( \int_0^t i_p dt \right) \right] \quad (4)$$

In the above equation, $$\int_0^t i_p dt$$

represents the time integral of photocurrent, which is a photocharge during a period in which the MOS switch 11 is on. When this is defined as Q, it is seen that the potential corresponding to the logarithm of Q appears at the capacitor 10. After the MOS switch 11 is turned off, the MOS switch 12 in each photoelectric conversion unit is turned on in order, whereby each signal is guided through the output line 15 to the amplifier 16 to be outputted from the output terminal 17.

Since the first embodiment of the present invention permits the logarithmic compression circuit of light signal to be constructed of the small number of elements without use of op amp, as described above, the present embodiment has the effect of decreasing the area and the supply current.

The above embodiment shown in FIG. 2 was the example in which the photoelectric conversion units 6 were arranged on one line, but it can also be contemplated that the photoelectric conversion units 6 are arranged in a matrix, the MOS switches 11 are driven by a vertical register, and the MOS switches 12 are driven by a horizontal register, whereby the apparatus can operate as an area image sensor capable of obtaining logarithmically compressed image signals in a wide dynamic range.

Figure 3:
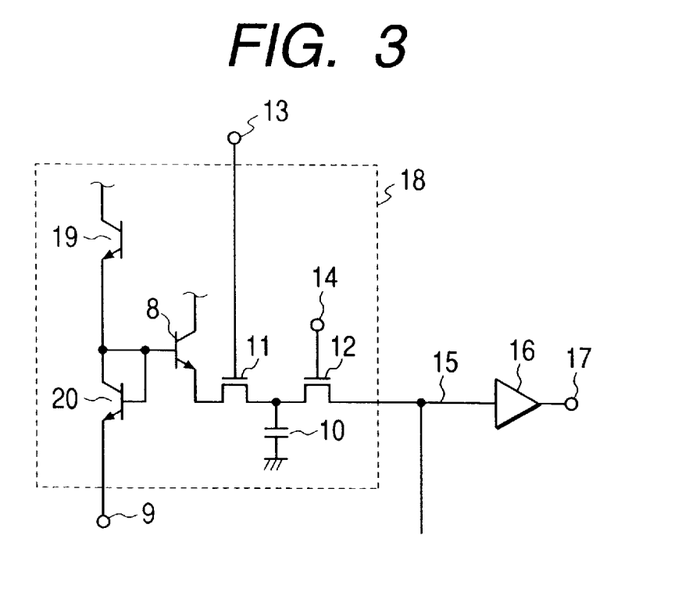
FIG. 3 is a circuit diagram to show the second embodiment.

FIG. 3 is a diagram to show the second embodiment of the present invention. In FIG. 3, reference numeral 18 designates one photoelectric conversion unit, 19 a phototransistor, and 20 a diode of such structure that the base and collector of a bipolar transistor are short-circuited. In FIG. 3, common parts to FIG. 2 are denoted by the same reference numerals and the description thereof will be omitted.

In the second embodiment illustrated in FIG. 3, the functions of the bipolar transistor 7 of FIG. 2, the role of phototransistor and the role of logarithmic compression, are allocated separately to the phototransistor 19 and to the bipolar transistor 20, and the logarithmic compression operation of signal charge is the same as in the first embodiment.

The second embodiment permits the phototransistor 19 for reception of light to be placed physically apart from the logarithmic compression circuit, so that an aperture ratio of the limited light-receiving pixel area can be increased.

Although FIG. 3 of the present embodiment shows only one photoelectric conversion unit 18, it is also possible to obtain a line sensor in higher density by connecting plural units in parallel on a line and guiding outputs of the MOS transistors 12 through the common line to the amplifier, as illustrated in FIG. 2. Further, when the phototransistor 19 is arranged at a light receiving area in a matrix form and the logarithmic compression circuit is arranged out of the light receiving area, the apparatus of the present invention can be used as a logarithmic compression type two-dimensional solid state image sensing device with a high aperture ratio.

Figure 4:
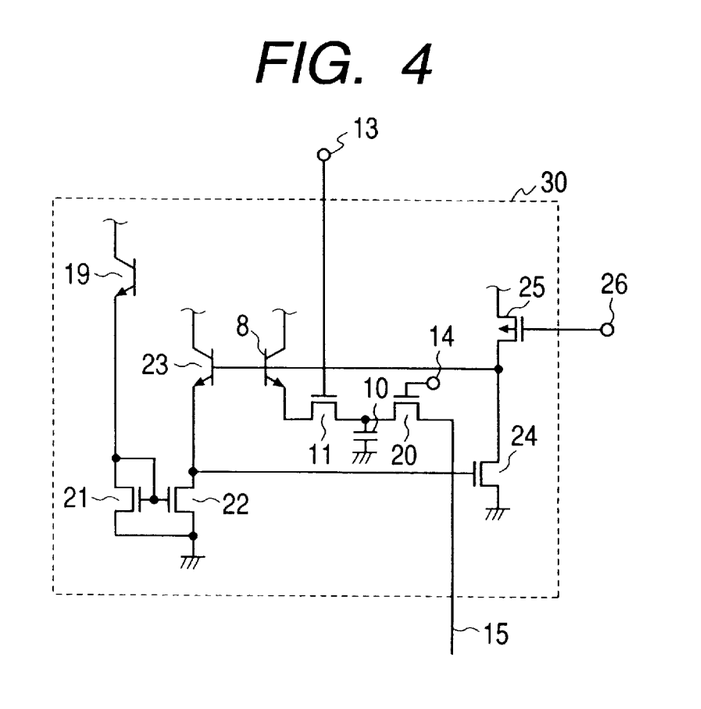
FIG. 4 is a circuit diagram to show the third embodiment.

FIG. 4 is a diagram to show the third embodiment of the present invention, in which the same parts as those in FIG. 2 and FIG. 3 are denoted by the same reference numerals.

In FIG. 4, numeral 30 denotes a photoelectric conversion unit, 20 a MOS transistor for outputting a light signal in the capacitor 10 to the output line by switching, 21 a MOS transistor for receiving the photocurrent from the phototransistor, the gate and drain of which are connected to each other, and 22 a MOS transistor the gate of which is connected to the gate of the MOS transistor 21, the MOS transistor pair of the MOS transistors 21 and 22 composing a current mirror. Numeral 23 represents one of a pair of bipolar transistors for logarithmic compression, the emitter current of which is a signal current reflected by the current mirror of the MOS transistor pair. Numeral 24 indicates a MOS transistor the gate of which is connected to the drain of the MOS transistor 22 and to the emitter of the transistor 23, 25 a p-type MOS transistor for supply of a constant current, and 26 a gate potential supply terminal which determines the constant current value of the p-type MOS transistor 25.

The MOS transistors 24 and 25 compose an inverting amplifier having a very large gain. The output of this inverting amplifier, in which the drains of the MOS transistors 24 and 25 is connected, is connected to the bases of the bipolar transistor pair 8 and 23. Since the gain of the inverting amplifier composed of the MOS transistors 24, 25 is very large, the base of the bipolar transistor 23 varies with variations of the signal current, while the emitter potential of the bipolar transistor 23 can be assumed to be always constant.

Therefore, this part acts in the same manner as in the first and second embodiments, so that the logarithmically compressed potential of integration of the signal current appears in the capacitor 10.

The third embodiment necessitates only the limited elements of the bipolar transistors 8, 19, 23 whose collector is fixed, in addition to the MOS transistors, and can thus provide the logarithmic compression photoelectric conversion apparatus by a simple process.

Although FIG. 4 of the present embodiment shows only one photoelectric conversion unit 30, it is also possible to obtain a line sensor in a simple production process by connecting a plurality of units in parallel on a line and guiding the outputs of the MOS transistors 20 through the common line to the amplifier, as illustrated in FIG. 2. Further, when the phototransistor 19 is arranged at a light receiving area in a matrix form and the logarithmic compression circuit is arranged at an area other than the light receiving area, the apparatus of the present invention can be used as a logarithmic compression type two-dimensional solid state image sensing device with a high aperture ratio.

As described above, the first to third embodiments can provide the photoelectric conversion apparatus that can execute the logarithmic compression of light signal in the simple circuitry without use of op amp and that has the small area and acts at low supply current. Further, the logarithmic compression photoelectric conversion apparatus can be realized using only the MOS transistors and the bipolar transistors the collector potential of which is fixed.

The apparatus can output the logarithmic quantity of time integral of light signal current, which is effective, particularly, when one desires to know an average level of light signals within a certain fixed period of time.

The fourth embodiment of the present invention will be described next.

Various forms of photosensors are now available, including CCD, BASIS, MOS, MIM, and so on. In either one of the photosensors, when the pn junction part is exposed to light, the pn junction part absorbs the energy of photons to create carriers as electron-hole pairs therein. When the energy of photons is greater than the energy bandgap of the pn junction, electrons are excited from the valence band to the conduction band while holes are left in the valence band. The electrons migrate from the p-layer to the n-layer and the holes from the n-layer to the p-layer, generating a photovoltage. Structures of the photosensors also include the pin type, the Schottky type, the avalanche type, and so on, in addition to the above pn junction, and they are used according to specifications of received light wavelength, light receiving sensitivity, and so on.

Figure 5:
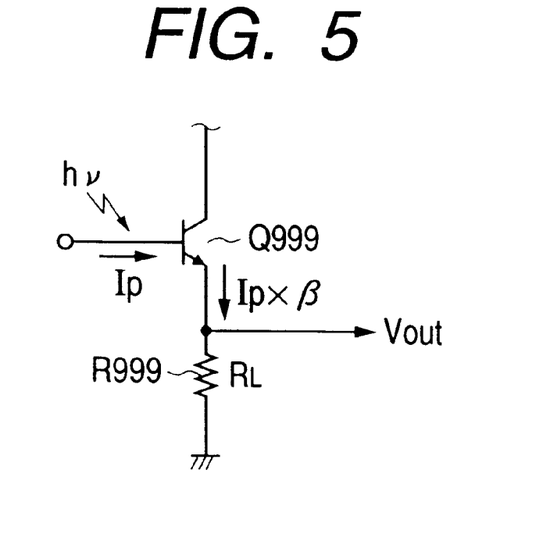
FIG. 5 is a diagram for explaining the fourth embodiment.

FIG. 5 shows a circuit example of a photosensor. In the figure, Q999 indicates a phototransistor making use of an npn transistor, which receives light in the base area and which outputs the current ($I_P \times \beta$) equal to the photocurrent ($I_P$) times the current gain ($\beta$). The output current is converted to a voltage by a load R999 as a current-voltage converting means to obtain a light signal output $V_{out}$.

Figure 6:
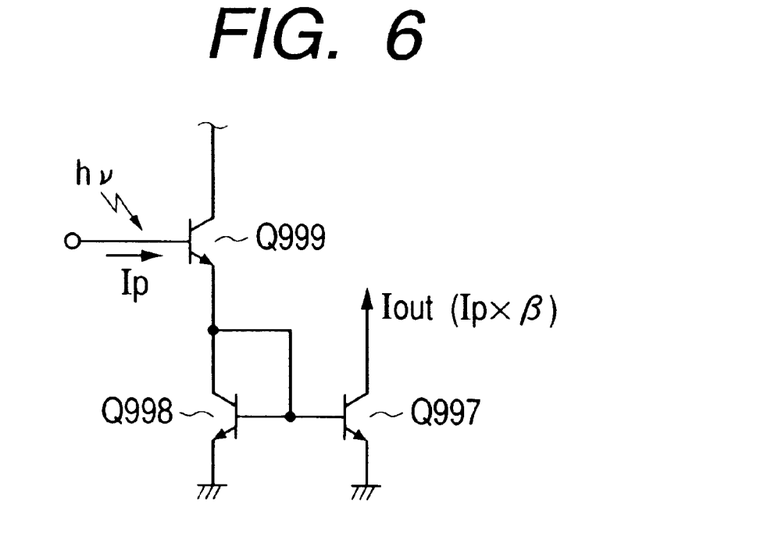
FIG. 6 is a diagram for explaining the fourth embodiment.

A circuit example of another photosensor employs a current mirror circuit composed of bipolar transistors Q998 and Q997, as illustrated in FIG. 6, to obtain the same mirror current as the current ($I_P \times \beta$) equal to the photocurrent times the current gain ($\beta$) of the phototransistor Q999.

The photosensors illustrated in FIGS. 5 and 6, however, offer considerable response time. The reason is as follows.

In general, the collector (emitter) current $I_C(I_E)$ of the bipolar transistors is expressed by the following equation.

$$I_C(I_E) = I_S \times \exp(qV_{be}/kT) \quad (5)$$

In this equation, $I_S$ is the reverse saturation current, $V_{be}$ the base-emitter voltage, q the electron charge quantity, k the Boltzmann constant, and T an absolute temperature. Namely, $I_C(I_E)$ varies with variation of $V_{be}$.

On this occasion, in the case of the photosensor of FIG. 5, the base potential and emitter potential vary, depending upon the light quantity; in the case of the photosensor of FIG. 6, because the emitter potential is semi-fixed by the current mirror circuit, the base potential varies depending upon the light quantity. In either case, the base potential varies and the base-collector capacitance ($C_{bc}$) is charged by the photocurrent ($I_P$).

However, since the base is the light receiving area, the optical response becomes poor because of the considerable base-collector capacitance of the large area phototransistor.

Figure 7:
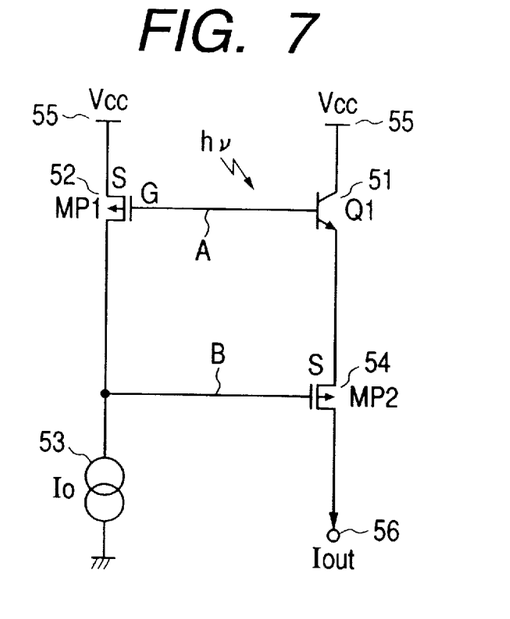
FIG. 7 is a circuit diagram to show the fourth embodiment of the the present invention.

FIG. 7 is a circuit diagram which best expresses the fourth embodiment of the present invention. In the figure, numeral 51 designates an npn phototransistor Q1, 52 a PMOS (MP1) for fixing the base potential of the transistor Q1 (51), 53 a current source ($I_O$) for specifying the current of the transistor MP1 (52), 54 a PMOS (MP2) for feeding the gate potential of MP1 (52) back to the drain of MP1, 55 a power supply ($V_{CC}$), and 56 a current output terminal $I_{out}$ of the phototransistor Q1 (51). Further, letter A represents the base terminal of the phototransistor Q1 (51) and B the gate terminal of MP2.

In general the current I flowing in MOSFET is given by the following relation.

$$I = \mu_0 C_{OX}(W/L)(V_g - V_s - V_{th})^2 \quad (6)$$

In this equation, $\mu_0$: carrier mobility
$C_{OX}$: gate capacitance per unit area
W : gate width
L : gate length
$V_g$: gate potential
$V_s$: source potential
$V_{th}$: threshold voltage.

Based on the above, the operation of FIG. 7 will be described. The following describes the operation of FIG. 7.

When the constant current $I_0$ from the constant current source 53 flows in PMOS (MP1), the gate of MP1 (A: the base of Q1) maintains a constant potential difference to $V_{CC}$. Namely, when the voltage of A is $V_A$, the following equation holds according to Eq. (6).

$$I_0 = \mu_0 C_{OX}(W/L)(V_{CC} - V_A - V_{th1})^2 \quad (7)$$

In this equation, $V_{th1}$ is the threshold voltage of MP1, $\mu_0$ the channel mobility of MP1, $C_{OX}$ the gate capacitance per unit area of MP1, W the gate width of MP1, and L the gate length of MP1.

The power supply $V_{CC}$ has the same potential as the collector of Q1 and $V_A$ is the same potential as the base of Q1. Therefore, the collector-base potential of Q1 is kept constant.

The potential of the base terminal A is made stable by connecting the gate potential of MP2 to the drain of MP1. The potential of the gate terminal B is lower than that of the base terminal A by $V_{be}$ of Q1 and $V_{gs}$ (source-gate potential difference) of MP2, and the voltages $V_{be}$, $V_{gs}$ are uniquely determined by the current $I_P \times \beta$ flowing in Q1 and MP2.

As described above, the present embodiment can realize the structure in which the collector-base potential of the phototransistor Q1 is defined by the source-gate potential of PMOS (MP1) and in which the emitter potential of Q1 varies according to the light quantity to change the current of the phototransistor The conventional apparatus had the poor response because of the charging for the large base capacitance ($C_{bc}$); whereas the apparatus of the present embodiment constructed as described above necessitates only the small emitter capacitance ($C_{be}$) and drain capacitance of the feedback MOS (MP2), and therefore the response is improved remarkably.

The above embodiment was described as to the circuit diagram of the apparatus improved in quick charging and quick response by preventing the degradation of response characteristics due to the charging current in the photoelectric conversion element Q1, but it can also be adapted to configurations wherein a plurality of photoelectric conversion elements are arranged on a line or in a matrix in an area.

Figure 8:
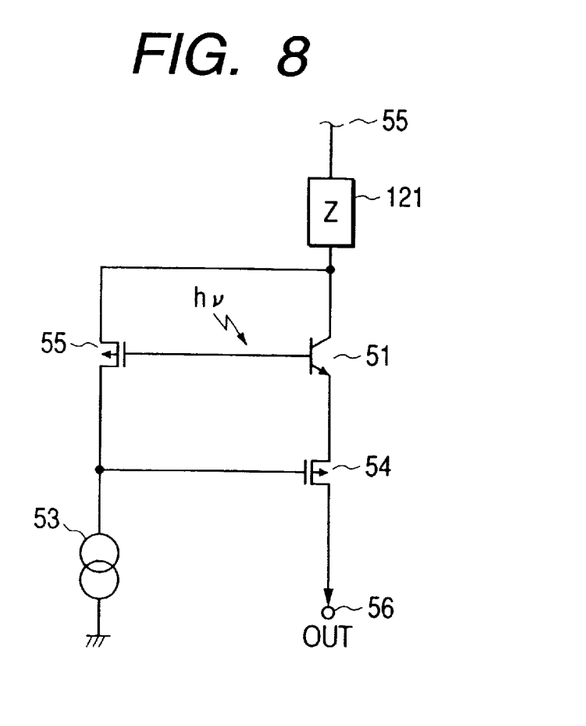
FIG. 8 is a circuit diagram to show the fifth embodiment of the present invention.

FIG. 8 is a circuit diagram to show the fifth embodiment. If the withstand voltage of the MOSFETs is low, the PMOS (54) will sustain damage. In order to avoid it, as illustrated in FIG. 8, a level shift circuit 121 is inserted to permit the MOSFETs to be used at low voltage. In this configuration, the collector of the phototransistor 51 is also kept at the same potential as the source of PMOS 52 and the base of the phototransistor 51 at the same potential as the gate of PMOS 52, thereby producing the effect of improving the optical response, of the present invention.

In FIG. 8, numerals 51 to 56 are exactly the same as those in FIG. 7 and, therefore, the description thereof is omitted herein. The circuit of the present embodiment is provided with the level shift circuit 121, whereby the photocharge stored in the base of the phototransistor 51 can be read out as an output current of PMOS 54 while the operating voltage of the PMOSs 52, 54 is lowered by the level shift circuit 121, even if the withstand voltage of the PMOSs 52, 54 is low. In that case, the present embodiment can implement the configuration in which the collector-base potential of the phototransistor Q1 is specified by the source-gate potential of PMOS (MP1) and in which the emitter potential of Q1 varies according to the light quantity to change the current of the phototransistor Q1.

Figure 9:
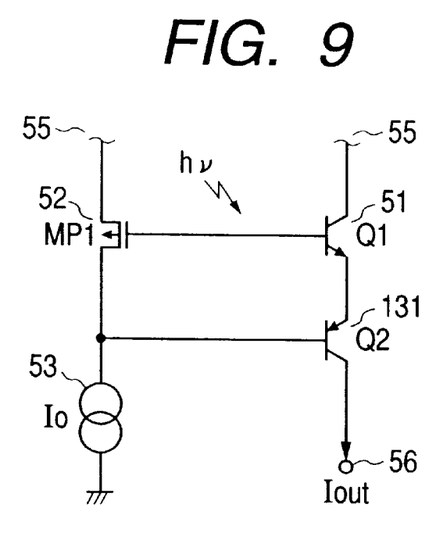
FIG. 9 is a circuit diagram to show the sixth embodiment of the present invention.

FIG. 9 is a circuit diagram to show the sixth embodiment. The present embodiment is a modification of FIG. 7 obtained by replacing the MP2 (54) illustrated in FIG. 7 with a pnp transistor Q2 (131), in which the gate potential of MP1 can be fed back to the drain of MP1, using $V_{be}$, of the pnp transistor Q2.

In the same figure, the power supply $V_{CC}$ 55 has the same potential as the collector of the phototransistor Q1 and the gate potential of the PMOS 52 is the same potential as the base potential of the phototransistor Q1. Therefore, the collector-base potential of the phototransistor Q1 is kept constant.

Further, the potential of the base terminal of the phototransistor Q1 is made stable by connecting the base potential of the potential stabilizing transistor Q2 to the drain of MP1. The potential of the base terminal of the transistor Q2 is lower than that of the base terminal of the phototransistor Q by $V_{be}$ of Q1 and $V_{be}$ (base-emitter potential difference) of Q2, and $V_{be}$ of Q1 and $V_{be}$ of Q2 are uniquely determined by the current $I_P \times \beta$ flowing in Q1 and Q2.

As described above, the present embodiment can realize the configuration in which the collector-base potential of the phototransistor Q1 is specified by the source-gate potential of the PMOS (MP1) and the emitter potential of Q1 varies according to the light quantity to change the current of the phototransistor Q1.

The conventional apparatus had the poor response because of the charging for the large base capacitance ($C_{bc}$); whereas the present embodiment necessitates only the charging of the small emitter capacitance ($C_{be}$), and the emitter capacitance of the feedback pnp transistor Q2 smaller than the source capacitance of the MOS type, and the charging current is $I_P \times \beta$ in the present embodiment, as compared with Ip before. Therefore, the response is improved remarkably.

Figure 10:
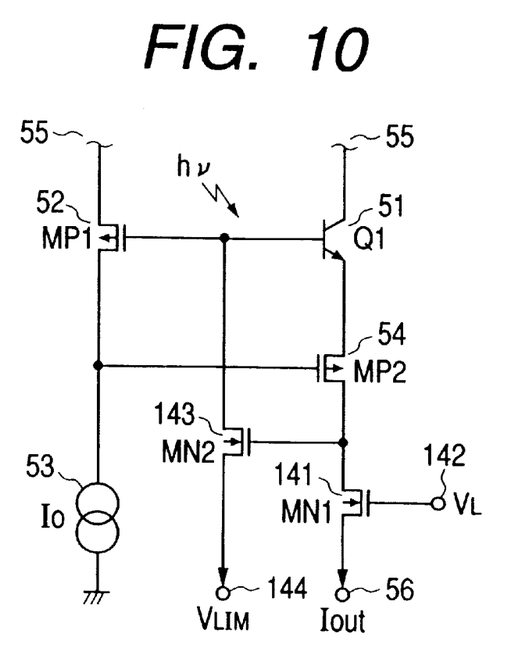
FIG. 10 is a circuit diagram to show the seventh embodiment of the present invention.

FIG. 10 is a circuit diagram of a photoelectric conversion apparatus according to the seventh embodiment. FIG. 10 shows a circuit configuration provided with a current limiting circuit (limiter) used during irradiation with large quantity of light. In the figure, numerals 51 to 55 denote the same components as those in FIG. 7, and redundant description thereof will be omitted herein.

In FIG. 10, reference numeral 141 (MN1) indicates an NMOSFET for setting a limit current, and 143 (MN2) a switching NMOS transistor acting upon actuation of the limiter, which is connected to a limit potential $V_{LIM}$ of 144. The operation will be described below.

Under very bright circumstances, the photocharge increases in the base of the phototransistor Q1 and a large current ($I_P \times \beta$) flows from the phototransistor Q1. When the current exceeds a current value set by a limiter voltage according to a gate potential VL 142 in MN1 (141), MN2 is turned on to prevent the base potential of the phototransistor Q1 from extremely increasing. The set current in MN1 (141) is expressed as follows according to above Eq. (6).

$$I_{LIM} = \mu_n C_{OX}(W_N/L_N)(V_L - V_6 - V_{thN}) \quad (8)$$

In this equation, $I_{LIM}$: set current (limit current)

$\mu_n$: channel mobility of NMOS $W_N$: gate width of MN1

$L_N$: gate length of MN1

$V_L$: set voltage (gate voltage of MN1)

$V_6$: source voltage of MN1 (voltage at terminal $I_{out}$)

$V_{thN}$: threshold of MN1.

When the following relation is satisfied;

$$I_P \times \beta > I_{LIM},$$

the gate voltage of MN2 (143) exceeds the threshold $V_{th}$ of MN2 to switch MN2 on, whereby preventing the base potential of the phototransistor Q1 (51) from extremely increasing. Therefore, the current limiter starts its action.

This permits the apparatus to be provided with an overflow function for preventing blooming due to excessive light.

Figure 11:
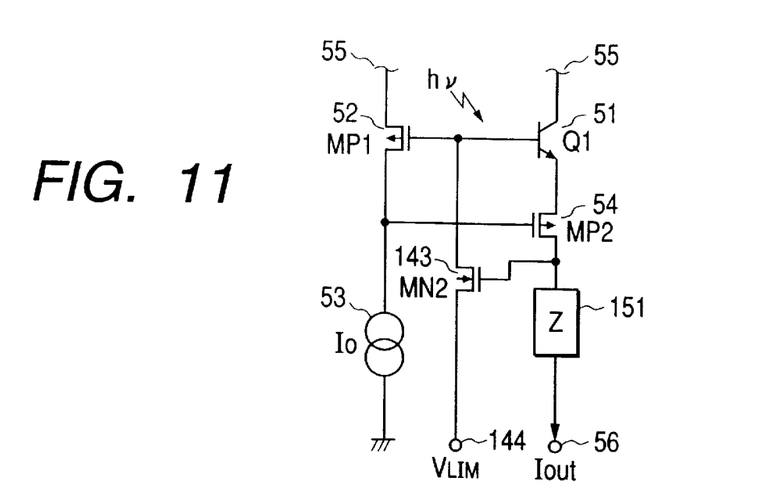
FIG. 11 is a circuit diagram to show the eighth embodiment of the present invention.

The eighth embodiment of the present invention demonstrates that the same effect as in the seventh embodiment can also be realized by use of a passive element such as a resistor or the like. FIG. 11 is a circuit diagram of a photosensor according to the present embodiment. In the figure, the circuit configuration is substantially the same as that of the seventh embodiment except that the NMOS 141 (MN1) is replaced by a passive element 151, for example, by a resistor, and thus redundant description of each portion will be omitted herein.

The operation in the range of low illuminance to normal illuminance is the same as the operation illustrated in FIG. 7, but, in the range of higher illuminance, the limiter operation is implemented in such a manner that the gate potential of NM2 (143) comes to exceed the threshold with its potential increase due to the output current $I_{out}$ of the passive element Z 151 and the photosensor.

Figure 12:
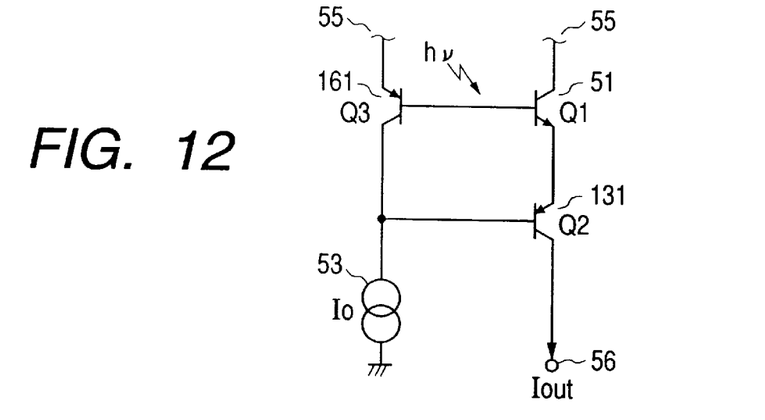
FIG. 12 is a circuit diagram to show the ninth embodiment of the present invention.

FIG. 12 is a circuit diagram of a photosensor according to the ninth embodiment, which is a modification of the sixth embodiment and in which the element driven by the constant current $I_0$ is a pnp transistor Q3 (161). The operation is substantially the same as in the sixth embodiment, but the base potential of the phototransistor Q1 is clamped by the base potential of the pnp transistor Q3.

When the constant current $I_0$ from the constant current source is allowed to flow to the pnp transistor Q3, the base-emitter voltage of the pnp transistor Q3 becomes constant to make the base potential of the phototransistor Q1 clamped, and the output current Iout is outputted according to the illuminance. In this case, the charging current to the base potential of the phototransistor Q1 is decreased, as discussed in the prior art example, so that the response speed of photoelectric conversion signal output can be increased.

Figure 13:
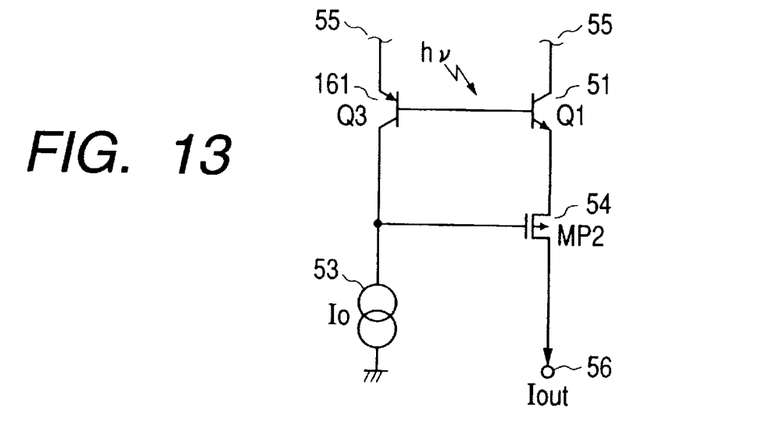
FIG. 13 is a circuit diagram to show the tenth embodiment of the present invention.

FIG. 13 is a circuit diagram of a photosensor to show the tenth embodiment of the present invention, which is a combination of the sixth embodiment with the ninth embodiment.

In FIG. 13, the apparatus of the present embodiment is composed of a phototransistor Q1, a pnp transistor Q3 the base of which is connected to the base of the phototransistor Q1, a current source 53 connected to the collector of the pnp transistor Q3, and a feedback PMOS (MP2) 54 the gate of which is connected to the collector of the pnp transistor Q3 and the source of which is connected to the emitter of the phototransistor Q1, and the output current $I_{out}$ of the photosensor can be gained from the drain of the PMOS (MP2) 54.

As seen from the forth to tenth embodiments described above, the embodiments were the examples wherein the element and the terminal thereof for clamping the base of the phototransistor Q1, were the gate of PMOS or the base of the pnp transistor, but it is also apparent that applications of MESFET, JFET, etc. to the element are also within the scope of the present invention, if the element employed is one in which the control electrode indicated by the base electrode A becomes a constant voltage in the operation at the constant current $I_0$ of the constant current source 53 and if the control electrode is a high input impedance.

The above embodiments were the examples in which the phototransistor was of the npn type and in which the element for keeping the base at the constant voltage was of PMOS, but it is also apparent that elements of opposite polarities to those are also within the scope of the present invention.

Further, the embodiments were the examples using one phototransistor Q1 as a photosensor, but the present invention can also be applied to line sensors and area sensors. In application to a line sensor, a plurality of phototransistors Q1 are arranged on a line, the peripheral circuits for the phototransistor Q1 described in each embodiment are provided for each phototransistor Q1, an output current is stored, for example, in a storage capacitor in every phototransistor Q1, and the currents are read out successively in time series, thereby obtaining image signals of the line sensor. In application to an area sensor, phototransistors and their peripheral circuits are arrayed in a matrix, and image signals corresponding to photocharges received by the respective phototransistors can be gained in time series by a vertical register or a vertical scanning circuit for driving rows of phototransistors and a horizontal register or a horizontal scanning circuit for driving lines of phototransistors.

As described above, the fourth to tenth embodiments provide the apparatus wherein the base potential of the phototransistor is controlled by the gate potential of MOS driven at the constant current, and can thus enjoy the following advantages;

(1) charging is unnecessary for the base-collector capacitance of the phototransistor;

(2) the charging of the base-emitter capacitance is β times ($H_{FE}$ times) the photocurrent.

Therefore, the phototransistors can be constructed with quick response.

Even if the base area of the phototransistor of the photoelectric conversion element is large, so as to result in a large aperture rate, the optical response characteristics of the photosensor can be improved without need for attention to the charging current to the base area.

Figure 14:
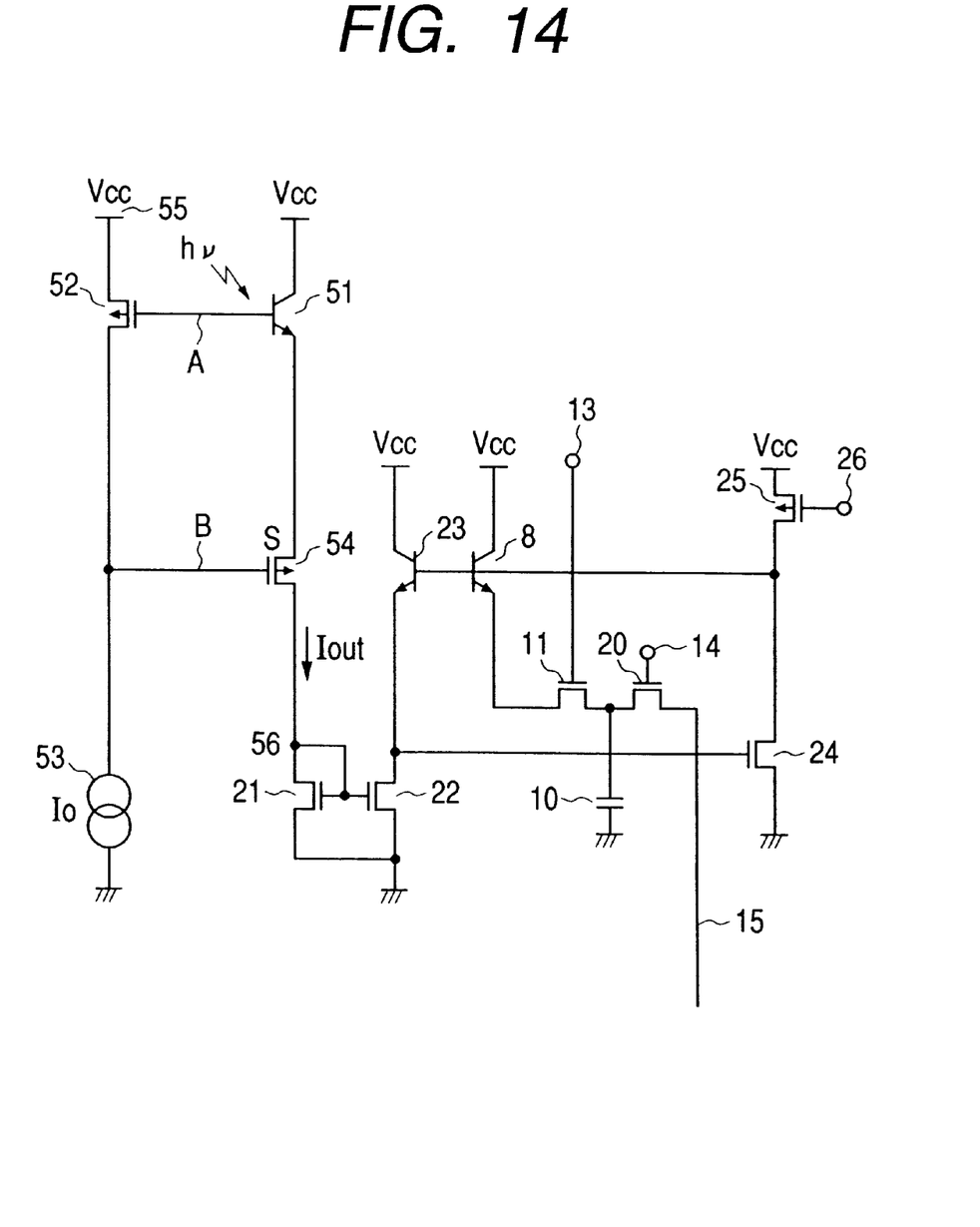
FIG. 14 is a circuit diagram to show the eleventh embodiment of the present invention.

FIG. 14 is a diagram to show the eleventh embodiment, which is a combination of the third embodiment with the fourth embodiment.

In FIG. 14, the same elements as those in FIG. 4 and FIG. 7 are denoted by the same reference numerals.

As illustrated in FIG. 14, the current is made to flow from the current output terminal 56 of FIG. 7 to the current mirror circuit 21, 22 of FIG. 4, whereby the present embodiment can provide the photoelectric conversion apparatus having the good optical response characteristics and being capable of performing the logarithmic compression of light signal in the simple circuit configuration.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus comprising:
a pair of transistors respective control electrodes of which are connected to each other; and
a capacitor;
wherein said pair of transistors are arranged so that a potential of a main electrode of one transistor is fixed to a constant potential and so that a main electrode of the other transistor is connected to said capacitor and wherein a voltage or a charge appearing in said capacitor is taken out as a signal.

2. The photoelectric conversion apparatus according to claim 1, further comprising: a first switch connected between said capacitor and the main electrode of said other transistor out of the pair of transistors; and a second switch for connecting said capacitor to an output line, wherein a photoelectric conversion unit comprises said pair of transistors, said first switch, said second switch, and said capacitor, and wherein a plurality of said photoelectric conversion units are connected in parallel and outputs of said second switches are common.

3. The photoelectric conversion apparatus according to claim 2, wherein control terminals of said first switches are connected to a common line through which a simultaneous reading signal is supplied thereto, and wherein the output terminals of said second switches are connected to an amplifier and the second switches are subjected successively to on/off control to output light reading signals in time series.

4. The photoelectric conversion apparatus according to claim 1, further comprising: a first switch connected between said capacitor and the main electrode of said other transistor out of the pair of transistors, and a second switch for connecting said capacitor to an output line, wherein a photoelectric conversion unit comprises said pair of transistors, said first switch, said second switch, and said capacitor, and wherein a plurality of said photoelectric conversion units are connected in a matrix and outputs of said second switches are common.

5. The photoelectric conversion apparatus according to claim 1, wherein said one transistor performs photoelectric conversion.

6. A photoelectric conversion apparatus comprising:

a photoelectric conversion element;

a first transistor one main electrode of which is connected to an output terminal of the photoelectric conversion element and another main electrode is connected to a fixed potential;

a second transistor having a control electrode joined to said output terminal; and a capacitor connected to a main electrode of the second transistor.

7. The photoelectric conversion apparatus according to claim 6, further comprising: a first switch connected between said capacitor and the main electrode of said second transistor; and a second switch for connecting said capacitor to an output line, wherein a photoelectric conversion unit comprises said first transistor and second transistor, and wherein a plurality of said photoelectric conversion units are connected and outputs of said second switches are common to said plurality of said photoelectric conversion units.

8. A photoelectric conversion apparatus comprising:

a photoelectric conversion element;

a current mirror circuit an input of which is connected to an output terminal of the photoelectric conversion element;

a pair of transistors a main electrode of one transistor of which is connected to another input of the current mirror circuit and which have a common control electrode;

a capacitor connected to a main electrode of the other transistor out of the pair of transistors; and an inverting amplifier an input portion of which is connected to the main electrode of said one transistor and an output portion of which is connected to the common control electrode.

9. The photoelectric conversion apparatus according to claim 8, further comprising: a first switch connected between said capacitor and the main electrode of said other transistor; and a second switch for connecting said capacitor to an output line, wherein a photoelectric conversion unit comprises said first switch and second switch, and wherein a plurality of said photoelectric conversion units are connected and outputs of said second switches are common.

10. A photoelectric conversion apparatus comprising:

a phototransistor having a control electrode portion for receiving light and a main electrode portion for outputting a signal; and potential control means for changing a potential of said main electrode portion without variation of a potential of said control electrode portion.

11. The photoelectric conversion apparatus according to claim 10, wherein said phototransistor receives the light in a base portion thereof and outputs a current from an emitter thereof by amplifying a photocurrent, and wherein said potential control means comprises:

a first MOSFET having a gate connected to the base of said phototransistor and a source connected to a collector of said phototransistor;

a second MOSFET having the same polarity as said first MOSFET has, said second MOSFET having a source connected to an emitter of said phototransistor, a gate connected to a drain of said first MOSFET, and a drain for outputting the photocurrent amplified by said phototransistor; and a constant current source for driving said first MOSFET.

12. The photoelectric conversion apparatus according to claim 10, wherein said phototransistor receives the light in a base portion thereof and outputs a current from an emitter thereof by amplifying a photocurrent, and wherein said potential control means comprises:

a first MOSFET having a gate connected to the base of said phototransistor and a source connected to a collector of said phototransistor;

a bipolar transistor having an opposite polarity to that of said phototransistor, and said bipolar transistor having an emitter connected to the emitter of said phototransistor, a base connected to a drain of said first MOSFET, and a collector for outputting the photocurrent amplified by said phototransistor; and a constant current source for driving said first MOSFET.

13. The photoelectric conversion apparatus according to claim 10, wherein said phototransistor receives the light in a base portion and outputs a current from an emitter thereof by amplifying a photocurrent, and wherein said potential control means comprises:

a first bipolar transistor having a base connected to the base of said phototransistor and an emitter connected to a collector of said phototransistor;

a second bipolar transistor having the same polarity as said first bipolar transistor has, said second bipolar transistor having a source connected to the emitter of said phototransistor, a base connected to a collector of said first bipolar transistor, and a collector for outputting the photocurrent amplified by said phototransistor; and a constant current source for driving said first bipolar transistor.

14. The photoelectric conversion apparatus according to claim 11, further comprising:

overflow detecting means comprising a third MOSFET to a source or a drain of which the current outputted from the drain of said second MOSFET is inputted, to a gate of which an arbitrary gate potential specifying a maximum current value is applied, and which outputs said current from the source or the drain; and switch means comprising a fourth MOSFET a gate of which is connected to the drain of said second MOSFET, a drain of which is connected to the base of said phototransistor, and a source of which is connected to a constant voltage.

15. The photoelectric conversion apparatus according to claim 12, further comprising:

overflow detecting means comprising a third MOSFET to a source or a drain of which the current outputted from the drain of said second MOSFET is inputted, to a gate of which an arbitrary gate potential specifying a maximum current value is applied, and which outputs said current from the source or the drain; and switch means comprising a fourth MOSFET a gate of which is connected to the drain of said second MOSFET, a drain of which is connected to the base of said phototransistor, and a source of which is connected to a constant voltage.

16. The photoelectric conversion apparatus according to claim 13, further comprising:

overflow detecting means comprising a third MOSFET to a source or a drain of which the current outputted from the drain of said second MOSFET is inputted, to a gate of which an arbitrary gate potential specifying a maximum current value is applied, and which outputs said current from the source or the drain; and switch means comprising a fourth MOSFET a gate of which is connected to the drain of said second MOSFET, a drain of which is connected to the base of said phototransistor, and a source of which is connected to a constant voltage.

17. The photoelectric conversion apparatus according to claim 14, wherein said overflow detecting means is a passive element such as a resistor or the like.

18. The photoelectric conversion apparatus according to claim 15, wherein said overflow detecting means is a passive element such as a resistor or the like.

19. The photoelectric conversion apparatus according to claim 16, wherein said overflow detecting means is a passive element such as a resistor or the like.

20. An image pickup apparatus comprising a plurality of the photoelectric conversion apparatus as set forth in claim 10 arranged on plural lines or on an area.

21. A photoelectric conversion apparatus comprising:

a phototransistor having a control electrode portion for receiving light and a main electrode portion for outputting a signal;

potential control means for changing a potential of said main electrode portion without variation of a potential of said control electrode portion;

a pair of transistors respective control electrodes of which are connected to each other;

a capacitor;

wherein said pair of transistors are arranged so that a potential of a main electrode of one transistor is fixed to a constant potential and so that a main electrode of the other transistor is connected to said capacitor, and wherein a voltage or a charge appearing in said capacitor is taken out as a signal; and means for equalizing a signal level of an output from said phototransistor to a signal level of an output from the main electrode of said one transistor out of said pair of transistors.

* * * * *

UNITED STATES PATENT AND TRADEMARK OFFICE
CERTIFICATE OF CORRECTION

PATENT NO. : 6,300,615 B1
DATED : October 9, 2001
INVENTOR(S) : Mahito Shinohara et al.

It is certified that error appears in the above-identified patent and that said Letters Patent is hereby corrected as shown below:

Column 2,
Line 44, "does" should read -- denotes --.

Column 3,
Line 27, "$\dfrac{C\,I_{S1}}{h_{FE\,S2}}$" should read -- $\dfrac{C\,I_{S1}}{h_{FE}I_{S2}}$ --.

Line 29, "$\dfrac{C\,I_{S1}}{h_{FE}}\dfrac{kT}{q}$" should read -- $\dfrac{C\,I_{S1}}{h_{FE}I_{S2}}\dfrac{kT}{q}$ --.

Column 4,
Line 59, "is" (first occurrence) should read -- are --.

Column 13,
Line 17, "10" should read -- 10, --.

Signed and Sealed this

Eighteenth Day of June, 2002

Attest:

*Attesting Officer*

JAMES E. ROGAN
*Director of the United States Patent and Trademark Office*